United States Patent [19]

Yoshihara et al.

[11] Patent Number: 4,645,297
[45] Date of Patent: Feb. 24, 1987

[54] FIBER REINFORCED RESIN COATED OPTICAL FIBER AND PROCESS FOR PRODUCING THE SAME

[75] Inventors: Mitsuo Yoshihara; Yoshitada Morikawa; Yasuo Yamamoto; Mitsuharu Komada; Masaaki Hattori, all of Osaka, Japan

[73] Assignee: Nitto Electric Industrial Co., Ltd., Osaka, Japan

[21] Appl. No.: 690,907

[22] Filed: Jan. 14, 1985

[30] Foreign Application Priority Data

Jan. 13, 1984 [JP] Japan ............... 59-4998

[51] Int. Cl.⁴ .............. D02G 3/00; G02B 6/44
[52] U.S. Cl. .................. 350/96.23; 350/96.30; 427/163; 428/367; 428/375; 428/378; 428/379; 428/389; 428/392; 428/394; 428/395
[58] Field of Search .......... 350/96.23, 96.34, 96.30; 428/367, 375, 379, 392, 394, 395, 393, 417, 378, 389; 427/163, 165, 386; 65/3.11; 525/502, 507

[56] References Cited

U.S. PATENT DOCUMENTS

| | | | |
|---|---|---|---|
| 3,549,481 | 12/1970 | Cesare et al. | 428/392 X |
| 4,311,726 | 1/1982 | Hacker et al. | 427/163 X |
| 4,479,984 | 10/1984 | Levy et al. | 427/163 X |
| 4,487,797 | 12/1984 | Watson | 428/392 X |

FOREIGN PATENT DOCUMENTS

| | | | |
|---|---|---|---|
| 177101 | 10/1982 | Japan | |
| 59-54645 | 3/1984 | Japan | 427/163 |

*Primary Examiner*—Lorraine T. Kendell
*Attorney, Agent, or Firm*—Sughrue, Mion, Zinn, Macpeak & Seas

[57] ABSTRACT

An optical fiber coated with a reinforcing material having an excellent heat resistance and a process for producing the same are disclosed. The reinforcing material comprises continuous filaments having impregnated therein a curable composition comprising (a) tri(meth)acrylate of trishydroxyalkyl isocyanurate,
(b) a modified phenol novolak-based resin having (meth)acryloyl groups in the molecule, and
(c) a polymerization initiator.

11 Claims, 3 Drawing Figures

FIG. 1
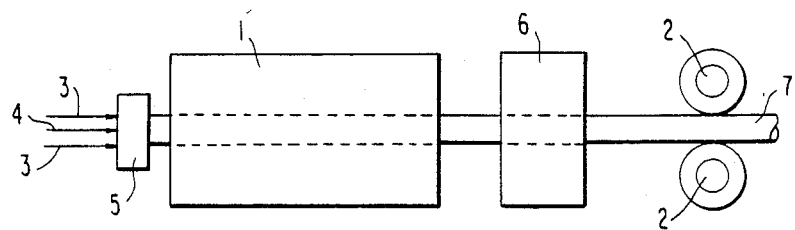
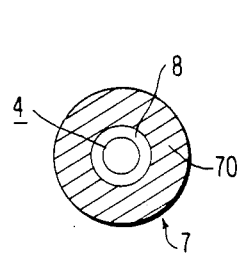
FIG. 2
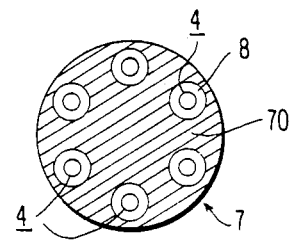
FIG. 3

FIBER REINFORCED RESIN COATED OPTICAL FIBER AND PROCESS FOR PRODUCING THE SAME

FIELD OF THE INVENTION

The present invention relates to an optical fiber coated with a fiber reinforced resin (hereinafter merely referred to as "FRP") having an excellent heat resistance and a process for producing the same.

BACKGROUND OF THE INVENTION

Optical fibers generally have a diameter of about 100 μm and, hence, their light transmission performances tend to be adversely affected by stresses due to impact from outside and linear expansion. When, therefore, the optical fibers are used in electric cables, for example, they have been coated with FRP to increase their mechanical strength and reliability. In this case, it is required for the FRP to have not only a high toughness but also a high heat resistance which can withstand a temporary high temperature condition (300°–500° C.) due to the lightning and the formation of surge current.

However, thermoplastic resins such as a polyethylene terephthalate or a polubutylene phthalate and thermosetting resins such as an epoxy resin or an unsaturated polyester resin which have been used in production of conventional FRP are easily thermally decomposed at the above-described high temperatures.

Various resins have been proposed as resin starting materials for producing the heat resistant FRP. FRP produced using these resins, however, do not satisfy the above two requirements, heat resistance and toughness. For example, if compounds containing a heterocyclic ring such as an isocyanurate ring are blended to increase the heat resistance, the heat resistance of the resulting FRP increases, but its toughness decreases. Thus, they cannot be used satisfactorily to coat the optical fibers. Furthermore, since the resins are often used in combination with solvents and their pot lives are short, they suffer from a disadvantage in that workability for coating the optical fibers is poor.

SUMMARY OF THE INVENTION

Accordingly, one object of the present invention is to provide an FRP coated optical fiber having excellent mechanical strength and heat resistance which can overcome the problems in the piror art.

Another object of the present invention is to provide a process for producing an FRP coated optical fiber having excellent mechanical strength and heat resistance by using a specific resin for a heat resistant FRP.

The FRP coated optical fiber according to the present invention comprises an optical fiber having provided thereon a cured layer of a reinforcing material comprising continuous filaments having impregnated therein a curable composition comprising (a) tri(meth)acrylate of trishydroxyalkyl isocyanurate, (b) a modified phenol novolak-based epoxy resin comprising a phenol novolak-based epoxy resin having introduced therein (meth)acryloyl groups and (c) a polymerization initiator.

Further, the process for producing an FRP coated optical fiber having excellent mechanical strength and heat resistance according to the present invention comprises coating an optical fiber with a reinforcing material, and heat curing the coating of the reinforcing material, the reinforcing material comprising continuous filaments having impregnated therein a curable composition comprising (a) tri(meth)acrylate of trishydroxyalkyl isocyanurate, (b) a modified phenol novolak-based epoxy resin comprising a phenol novolak-based epoxy resin having introduced therein (meth)acryloyl groups and (c) a polymerization initiator.

BRIEF DESCRIPTION OF THE DRAWINGS

FIG. 1 is a schematic flow diagram showing one embodiment of the process according to the present invention;

FIG. 2 is a cross-sectional view of an FRP coated optical fiber produced by the process of FIG. 1; and FIG. 3 is a cross-sectional view of another FRP coated optical fiber produced by the process of the present invention.

DETAILED DESCRIPTION OF THE INVENTION

The term "(meth)acrylate" used herein means acrylate and/or methacrylate and the term "(meth)acryloyl group" used herein means acryloyl group and/or methacryloyl group.

The curable composition of the present invention contains, as essential components, Components (a), (b) and (c). When the curable composition is cured by heating, the isocyanurate ring is contained in the basic skeleton to exhibit an excellent heat resistance, and the phenol novolak-based epoxy resin is contained in the basic skeleton to exhibit an excellent mechanical strength without deteriorating the heat resistance and also an excellent adhesion property to the reinforcing material. That is, the curable composition, when cured by heating, produces a cured product having excellent heat resistance, mechanical strength and adhesion property to the reinforcing material. Thus, the FRP coated optical fiber of the present invention prepared by using the above curable composition has excellent mechanical strength and heat resistance, and also has a greatly improved reliability.

The curable composition of the present invention can be handled without a solvent or with only a small amount of solvent in production of the desired FRP coated optical fiber. The curable composition is thermocuring and has no problem in the pot life. Further, the curable composition has a high thermocurable rate, the productivity of the FRP coated optical fiber can be increased.

Component (a), tri(meth)acrylate of trishydroxyalkyl isocyanurate, of the curable composition is a compound represented by the following formula:

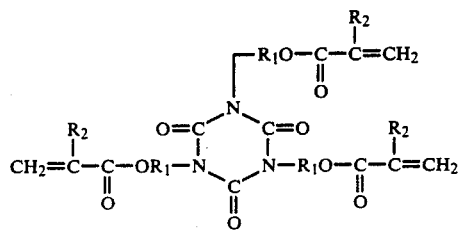

wherein $R_1$ is an alkylene group and $R_2$ is a hydrogen atom or a methyl group.

Examples of Component (a) are triacrylate of tris(2-hydroxyethyl)isocyanurate (m.p.: 52°–54° C.) and trimethacrylate of tris(2-hydroxyethyl)isocyanurate (m.p.:

80°–82° C.). This Component (a) can increase the heat resistance of the cured product due to the isocyanurate ring therein.

Component (b) in the curable composition is a modified phenol novolak-based epoxy resin which is generally prepared by reacting (meth)acrylic acid with a phenol novolak-based epoxy resin containing at least 4, preferably from 4 to 7, epoxy groups in the molecule. Thus, at least 4, preferably from 4 to 7, (meth)acryloyl groups are introduced. In this modified phenol novolak-based epoxy resin, an epoxy group may remain partly in the molecule.

By using the above modified phenol novolakbased epoxy resin in combination with the above Component (a), the heat resistance, mechanical strength and adhesion property to a reinforcing material of the cured product can be increased without deteriorating the heat resistance provided by Component (a). On the other hand, if the modified phenol novolak-based epoxy resin is replaced by a modified bisphenol-based epoxy resin prepared by modifying a bisphenol-based epoxy resin in the same manner as above, only a cured product having a poor heat resistance can be obtained. Thus, such a modified bisphenol-based epoxy resin is not preferred to use.

The curable composition of the present invention includes Components (a) and (b) as main components. The proportion of Component (a) to Component (b) is such that Component (a) constitutes from 20 to 90% by weight, preferably from 30 to 80% by weight, based on the total weight of Components (a) and (b). If the proportion of Component (a) is too small, the heat resistance of the resulting cured product is insufficient. On the other hand, if the proportion thereof is too large, a cured product obtained is brittle, the mechanical strength decreases and the adhesion property to a reinforcing material is insufficient.

In order to adjust the viscosity of the curable composition or the elongation and hardness of the cured product, other compounds containing a (meth)acryloyl group (Component (d)) may be added in an amount of 60% by weight or less based on the weight of the curable composition. Particularly preferred examples of such compounds are bisphenol-based epoxy di(meth)acrylates such as di(meth)acrylate of dioxydiethylene glycol of bisphenol A or F. In addition, trimethylolpropane tri(meth)acrylate, pentaerythritol tri(meth)acrylate, pentaerythritol tetra(meth)acrylate and the like can be used. If the proportion of Component (d) is too large, the heat resistance and mechanical strength of the resulting cured product decrease.

As the polymerization initiator, Component (c) in the curable composition, organic peroxides such as benzoyl peroxide, di-tert-butyl peroxide or tert-butyl perbenzoate are preferably used. In addition, known polymerization initiators such as azo compounds can be used. The amount of the polymerization initiator used is from 0.1 to 5 parts by weight, preferably from 0.5 to 3 parts by weight, per 100 parts by weight of Component (a) plus Component (b).

To the curable composition of the present invention can be mixed modifying resins and various additives in an amount which does not deteriorate the characteristics of the curable composition. Modifying resins which can be used include a phenol resin, an epoxy resin and a silicone resin. Additives which can be used include a silane coupling agent for increasing adhesion property, a pigment, and a filler.

The curable composition of the present invention can be prepared in the form of either solid or liquid at room temperature by appropriately determining its formulation. Moreover, the curable composition may be converted into a solution using a small amount of a solvent. This form can be determined appropriately depending on a method of molding the curable composition. The curable composition is cured by heating at 80° to 250° C. for about 1 to 10 minutes to obtain a cured product having excellent heat resistance, mechanical strength and adhesion property to a reinforcing material.

Continuous filaments which can be used in preparation of the reinforcing material as used herein include various fibers such as glass fibers (e.g., glass rovings or yarns), organic fibers (e.g., aramide fibers), carbon long fibers, piano wires, steel wires, iron wires, copper wires or aluminum wires. Of these materials, glass fibers are most suitable. It is also preferred for these continuous filaments to have a similar coefficient of linear expansion to that of the optical fibers.

In the production of the FRP coated optical fiber using the reinforcing material comprising the curable composition and continuous filaments, a draw-molding method is usually employed. In accordance with this method, the reinforcing material comprising the continuous filaments impregnated with the curable composition and one or a plurality of optical fibers are introduced simultaneously into a heating die and cured into one body while moving in the direction of die axis.

In this draw-molding method, FRP coated optical fibers having various cross sections can be produced by changing the shape and structure of a jig fitted to the heating die at a side from which the reinforcing material and optical fiber are introduced.

FIG. 1 is a schematic flow diagram showing an embodiment of the process of the present invention according to the draw-molding method. Continuous filaments 3-3 impregnated with the curable composition of the present invention and an optical fiber 4 are pulled into a heating due (die temperature: 80° to 250° C.) through a guide jig 5 provided at the front side of the heating die by means of a traction unit 2 provided at the rear side of the heating die 1, and moved through the heating die 1. During this period, the curable composition is cured together with the continuous filaments 3-3 and the optical fiber 4 into one body. If necessary, the cured product is introduced into a post-curing furnace 6 to produce an FRP coated optical fiber 7.

FIG. 2 is a cross-sectional view of the FRP coated optical fiber produced by the above-described process. Single optical fiber 4 is surrounded through a protective layer 8 by a long FRP member 70 having a circular cross section as a reinforcing material made up of continuous filaments which are converged in one direction and extended in the lengthwise direction.

FIG. 3 is a cross-sectional view of another example of the FRP coated optical fiber produced by the process of the present invention. In this case, a plurality of optical fibers 4-4 each provided with a protective layer 8 are disposed in the lengthwise direction of a long FRP member 70 and embedded in the inner periphery of the long FRP member 70. Depending on the shape of the guide jig to be used, the number of optical fibers to be embedded, and so forth, FRP coated optical fibers having various cross sections can be produced.

The above protective layer 8 is provided for the purpose of decreasing the amount of transmitting light leaked, increasing the mechanical strength or the like.

This protective layer (primary coating) is generally made of a silicone resin. However, the present invention is not limited thereto, and various resins having good heat resistance such as a urethane resin or an epoxy resin can be used.

The present invention is described in greater detail by reference to the following examples. All percents, parts, ratios and the like are by weight.

EXAMPLE 1

20 parts of triacrylate of tris(2-hydroxyethyl) isocyanurate, 30 parts of a modified phenol novolak-based epoxy resin (containing in average 5.5 acryloyl groups in the molecule), 50 parts of diacrylate of bisphenol F dioxydiethylene glycol and 1 part of tertbutyl perbenzoate were mixed and dissolved to prepare a curable composition having a viscosity of 8,100 cps (25° C.).

Glass fiber rovings were impregnated with the above-prepared curable composition and then introduced into a heating die (hole diameter: 1.0 mm, length: 1,000 mm, heating temperature: 150° C.) together with one optical fiber having a diameter of 0.4 mm prepared by providing a protective layer around a fiber filament having a diameter of 0.125 mm, in a state that the rovings encircled the optical fiber. It was draw-molded a drawing speed of 0.8 m/min to produce an FRP coated optical fiber having a diameter of 1.0 mm.

EXAMPLE 2

40 parts of triacrylate of tris(2-hydroxyethyl) isocyanurate, 20 parts of a modified phenol novolakbased epoxy resin (containing in average 5.5 acryloyl groups in the molecule), 20 parts of diacrylate of bisphenol F dioxydiethylene glycol, 20 parts of trimethylolpropane triacrylate and 1 part of tert-butyl perbenzoate were mixed and dissolved to prepare a curable composition having a viscosity of 4,650 cps (25° C.).

Using this composition, an FRP coated optical fiber was produced in the same manner as in Example 1.

EXAMPLE 3

50 parts of trimethacrylate of tris(2-hydroxyethyl) isocyanurate, 25 parts of a modified phenol novolak-based epoxy resin (containing in average 5.5 acryloyl groups in the molecule), 25 parts of trimethylolpropane triacrylate and 1 part of tert-butyl perbenzoate were mixed and dissolved to prepare a curable composition having a viscosity of 8,100 cps (25° C.).

Using this curable composition, an FRP coated optical fiber was produced in the same manner as in Example 1.

EXAMPLE 4

40 parts of triacrylate of tris(2-hydroxyethyl) isocyanurate, 20 parts of a modified phenol novolak-based epoxy resin (containing in average 5.5 methacryloyl groups in the molecule), 40 parts of diacrylate of bisphenol F dioxydiethylene glycol and 1 part of tertbutyl perbenzoate were mixed and dissolved to prepare a curable composition having a viscosity of 5,300 cps (25° C.).

Using this composition, an FRP coated optical fiber was produced in the same manner as in Example 1.

COMPARATIVE EXAMPLE 1

30 parts of a modified phenol novolak-based epoxy resin (containing in average 5.5 acryloyl groups in the molecule), 40 parts of diacrylate of bisphenol F dioxydiethylene glycol, 30 parts of trimethylolpropane triacrylate and 1 part of tert-butyl perbenzoate were mixed and dissolved to prepare a composition having a viscosity of 5,700 cps (25° C.).

Using this composition, an FRP coated optical fiber was produced in the same manner as in Example 1.

COMPARATIVE EXAMPLE 2

30 parts of triacrylate of tris(2-hydroxyethyl) isocyanurate, 40 parts of a modified bisphenol A-based epoxy resin (containing in average 2 acryloyl groups in the molecule), 30 parts of trimethylolpropane triacrylate and 1 part of tert-butyl perbenzoate were mixed to prepare a curable composition having a viscosity of 4,800 cps (25° C.).

Using this composition, an FRP coated optical fiber was produced in the same manner as in Example 1.

The FRP coated optical fibers produced in Examples 1 to 4 and Comparative Examples 1 and 2 were measured for the heat resistance and flexural strength.

Heat Resistance

The temperature of an FRP coated optical fiber was raised at a rate of 5° C./minute in the state that it was bent in a circular form having a diameter of 250 mm, and a temperature at which cracks were formed was determined.

Flexural Strength

Measured according to U.S. Army Specification "MIL-R-9300B TYPE II".

The results obtained are shown in the Table below.

TABLE

| | Heat Resistance (°C.) | Flexural Strength (kg/mm$^2$) |
|---|---|---|
| Example 1 | 190 | 58 |
| Example 2 | 220 | 55 |
| Example 3 | 240 | 53 |
| Example 4 | 230 | 52 |
| Comparative Example 1 | 150 | 55 |
| Comparative Example 2 | 170 | 30 |

It can be seen from the above results that an FRP coated optical fiber according to the present invention has excellent heat resistance and mechanical strength.

While the invention has been described in detail and with reference to specific embodiments thereof, it will be apparent to one skilled in the art that various changes and modifications can be made therein without departing from the spirit and scope thereof.

What is claimed is:

1. An optical fiber coated with a fiber reinforced resin comprising an optical fiber having provided thereon a cured layer of a reinforcing material comprising continuous filaments having impregnated therein a curable composition comprising
   (a) tri(meth)acrylate of trishydroxyalkyl isocyanurate,
   (b) a modified phenol novolak-based epoxy resin comprising a phenol novolak-based epoxy resin having introduced therein (meth)acryloyl groups, and
   (c) a polymerization initiator.

2. The coated optical fiber of claim 1, wherein Component (a) is a compound represented by the formula

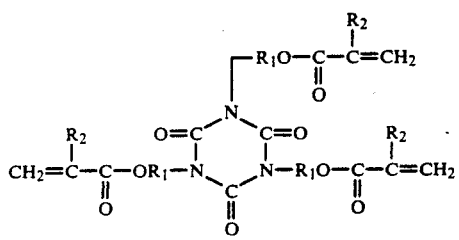

wherein R$_1$ is an alkylene group and R$_2$ is a hydrogen atom or a methyl group.

3. The coated optical fiber of claim 2, wherein the compound is selected from the group consisting of triacrylate of tris(2-hydroxyethyl) isocyanurate and trimethacrylate of tris(2-hydroxyethyl) isocyanurate.

4. The coated optical fiber of claim 1, wherein the modified phenol novolak-based epoxy resin has at least 4 (meth)acryloyl groups in the molecule.

5. The coated optical fiber of claim 1, wherein the amount of Component (a) is 20 to 90% by weight based on the total weight of Components (a) and (b).

6. The coated optical fiber of claim 5, wherein the amount of Component (a) is 30 to 80% by weight based on the total weight of Components (a) and (b).

7. The coated optical fiber of claim 1, wherein the amount of Component (c) is 0.1 to 5 parts by weight per 100 parts by weight of Components (a) and (b).

8. The coated optical fiber of claim 7, wherein the amount of Component (c) is 0.5 to 3 parts by weight per 100 parts by weight of Components (a) and (b).

9. The coated optical fiber of claim 1, wherein the continuous filaments are selected from the group consisting of glass fibers, organic fibers, carbon long fibers, piano wires, steel wires, copper wires and aluminum wires.

10. The coated optical fiber of claim 1, wherein the polymerization initiator is an organic peroxide.

11. The coated optical fiber of claim 10, wherein the polymerization initiator is selected from the group consisting of benzoyl peroxide, di-t-butyl peroxide and t-butyl perbenzoate.

* * * * *